United States Patent
Small et al.

(10) Patent No.: US 8,532,281 B1
(45) Date of Patent: Sep. 10, 2013

(54) SALES FORCE EFFECTIVENESS CALL FORWARD

(75) Inventors: Daniel S. Small, Charlotte, NC (US); Thomas Keifer, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1077 days.

(21) Appl. No.: 12/345,308

(22) Filed: Dec. 29, 2008

(51) Int. Cl.
*H04M 3/00* (2006.01)

(52) U.S. Cl.
USPC .................. 379/265.03; 379/265.02

(58) Field of Classification Search
USPC ................. 379/266.04, 265.02, 212
See application file for complete search history.

(56) References Cited

U.S. PATENT DOCUMENTS

| | | | | |
|---|---|---|---|---|
| 5,384,841 A | * | 1/1995 | Adams et al. | 379/266.04 |
| 6,215,865 B1 | * | 4/2001 | McCalmont | 379/212.01 |
| 6,603,854 B1 | * | 8/2003 | Judkins et al. | 379/265.06 |
| 2004/0064351 A1 | * | 4/2004 | Mikurak | 705/7 |
| 2005/0094799 A1 | * | 5/2005 | Elsey | 379/266.04 |

* cited by examiner

*Primary Examiner* — Amal Zenati
(74) *Attorney, Agent, or Firm* — Michael A. Springs; Moore & Van Allen PLLC; Jeffrey R. Gray

(57) ABSTRACT

Embodiments of the invention provide systems, methods, and computer program products for sales force management that improves sales contacts, improves client service experience, and provides objective data on the end-to-end sales and service process. When a client calls his/her client manager the call will be automatically switched to a call center representative. Systems will capture relationship and call data associated with the clients making the call and the client managers that are being called. The relationship data is sent to the call center representative taking the call to help serve the client. The call data is sent to process owners to review and track the sales force management system as a whole. The call center representatives will either answer the customer's questions or prepare a notification form to capture the reason for the call and send the notification to the appropriate client manager.

21 Claims, 5 Drawing Sheets

Client Manager Telephone Call Received Notification Form

310 — Severity Code in Email Subject Line
○ Code Red   ⊙ Code Yellow   ○ Code Green                [Minimize Form]

320 — Client Manager Information
First Name [          ]   Last Name [          ]   Corporate Directory [Find]
Email Address (optional)
[                    ]

330 — Subject of Email
○ Client is Requesting a Call Back
○ You received an Internal Call
○ Notification-No Action Required
○ Client Escalation
⊙ Sales Opportunity
○ Other
[          ]

340 — Client Information
○ Mr.   ○ Ms.   ⊙ No Title
First Name [          ]
Last Name [          ]
Account # [          ]
Phone [          ]
ID/TIN [          ]

350 — Client Requested Call Back Time
Date        Day         Time
[Calendar] [Mar 28, 2008] [Friday] at [7:45 am]

360 — Message to CM
[                                        ]

[Send Email to CM] [Preview Email] [Clear Form] [Exit]

SALES FORCE EFFECTIVENESS CALL FORWARD

FIELD

This invention relates generally to sales force management, and more particularly, embodiments of the invention relate to systems, methods, and computer program products for effectively utilizing sales teams and call center services for managing the client base.

BACKGROUND

Typically, field based sales teams and call center service units are truly separate entities. They communicate via phone calls and unstructured emails. Sales leads in the call center often fail to make it to the field teams and service issues, handled by the field teams, are often delayed and improperly handled.

Often call center services are set up in a purely supporting role in regard to client calls made to a client manager. As a result, clients wait for resolution of their requests until the client manger can find time to contact the call center service and resolve the client's request. The client manager is often in client meetings or is too busy handling numerous client service requests to react to new service requests in a timely manner. Meanwhile potential sales prospects to new clients or additional add-on sales to current clients often go uncultivated because of the lack of structure and organization in the client manager's routine, especially with respect to following up on client service requests.

Additionally, there is no way to capture or control the activities of the sales force or call center staff since there are no process owners in place to monitor the effectiveness of the interaction between the sales force and call center service representatives. Furthermore, no communication standard exists for the call center to provide sales leads to the field.

Unfortunately, there are gaps throughout the sales force and call center services whereby client requests can go hours or even days before a client manager gets around to contacting the call center service and responding to the client's requests. Also, client managers are forced to deal with service related issues and therefore cannot focus on procuring more sales and add-on features. Furthermore, no tools or methods are in place to provide process control and feedback about the effectiveness of collaboration between the sales force team and call center service representatives. There is a need for systems, methods, and computer program products for effectively utilizing sales teams and call center services to manage the client base.

BRIEF SUMMARY OF EMBODIMENTS OF THE INVENTION

Embodiments of the present invention address the above needs and/or achieve other advantages by providing a method, system, computer program product, or a combination of the foregoing to improve sales contacts, improve client service experience, and provide objective data on the end-to-end sales and service process.

One embodiment of the invention is a system for sales force management. The system comprises a computer-readable medium providing computer-readable instructions, a communication device, and a processor operatively coupled to the communication device and the computer-readable medium. The processor is configured to execute the computer-readable instructions to switch incoming calls coming from a client that are directed to a phone of a client manager to a phone of a call center representative. The processor is also configured to capture relationship data related to the client that is making the call or the client manager that the client is calling, and forward the relationship data to the call center representative to which the call is switched.

In another embodiment of the invention, the relationship data includes the client manger that is being called, the schedule of the client manger that is being called, the client that is making the call, the client account number, or the services the client manager has sold to the client.

In further accord with an embodiment of the invention, the processor is configured to execute the computer-readable instructions to create a notification related to the client call if the client manger needs to be notified regarding the client call, and then send the notification to the client manager.

In another embodiment of the invention, the processor is configured to execute the computer-readable instructions to capture call data related to all of the incoming calls from clients.

In yet another embodiment of the invention, the captured call data related to incoming calls comprises at least one of the call volume, the date and time of the call, the average speed of answer, the ring time, average talk time, the call origination, the call destination, the average, upper limit, and the lower limit of the number of calls made to the all the client managers.

In another embodiment of the invention, the processor is configured to execute the computer-readable instructions to develop charts or reports based on the captured call data related to the incoming calls.

In still another embodiment of the invention, the processor is configured to execute the computer-readable instructions to send the captured call data relating to the incoming calls to process owners or stakeholders for analysis.

In another embodiment of the invention the processor is configured to execute the computer-readable instructions to allow the process owners to notify the client managers or technicians when the process owners reviewing the captured call data discover that the calls made to a client manager are not being forwarded to the call center representative.

Another embodiment of the invention is a method comprising switching incoming calls coming from a client that are directed to a phone of a client manager to a phone of a call center representative. The method further comprises capturing, through the use of a processor, relationship data related to the client that is making the call or the client manager that the client is calling. The method then comprises forwarding, through the use of a processer, the relationship data related to the call center representative to which the call is switched.

In another embodiment of the invention, capturing relationship data comprises capturing the client manger that is being called, the schedule of the client manger that is being called, the client that is making the call, the client account number, or the services the client manager has sold to the client.

In further accord with an embodiment of the invention, the method comprises creating, through the use of a processer, a notification related to the client call if the client manger needs to be notified regarding the client call. The method further comprises sending, through the use of a processer, the notification to the client manager.

In another embodiment of the invention, the method comprises capturing, through the use of a processer, call data related to all of the incoming calls from clients.

In yet another embodiment of the invention, capturing call data related to incoming calls comprises capturing at least one of the call volume, the date and time of the call, the average speed of answer, the ring time, average talk time, the call origination, the call destination, and the average number, upper limit, and the lower limit of the number of calls made to the all the client managers.

In another embodiment of the invention, the method comprises developing, through the use of a processer, charts or reports based on the captured call data related to the incoming calls.

In still another embodiment of the invention, the method comprises sending, through the use of a processer, the captured data related to the incoming calls to process owners or stakeholders for analysis.

In another embodiment of the invention, the method comprises allowing the process owners to notify the client managers or technicians when the process owners reviewing the captured call data discover that the calls made to a client manager are not being forwarded to the call center representative.

Another embodiment of the invention is a computer program product for a sales force management system, the computer program product comprises at least one computer-readable medium having computer-readable program code portions embodied therein. The computer-readable program code portion comprises a first, second, and third executable portion. The first executable portion is configured for switching incoming calls coming from a client that are directed to a phone of a client manager to a phone of a call center representative. The second executable portion is configured for capturing relationship data related to the client that is making the call or the client manager that the client is calling. The third executable portion is configured for forwarding the relationship data related to the call center representative to which the call is switched.

In another embodiment of the invention, the relationship data includes the client manger that is being called, the schedule of the client manger that is being called, the client that is making the call, the client account number, or the services the client manager has sold to the client.

In further accord with an embodiment of the invention, the computer program product further comprises other executable portions. One executable portion is configured for creating a notification related to the client call if the client manager needs to be notified regarding the client call. Another executable portion is configured for sending the notification to the client manager.

In another embodiment of the invention, the computer program product further comprises an executable portion configured for capturing call data related to incoming calls.

In still another embodiment of the invention, the executable portion configured for capturing data related to incoming calls comprises capturing at least one of the call volume, the date and time of the call, the average speed of answer, the ring time, average talk time, the call origination, the call destination, and the average number, upper limit, and the lower limit of the number of calls made to the all the client managers.

In another embodiment of the invention, the executable portion configured for capturing call data related to incoming calls further comprises an executable portion configured for developing charts or reports based on the captured data related to the incoming calls.

In yet another embodiment of the invention, the executable portion configured for capturing call data related to incoming calls further comprises an executable portion configured for sending the captured data related to the incoming calls to process owners or stakeholders for analysis.

In another embodiment of the invention, the executable portion configured for sending the captured data related to the incoming calls to process owners or stakeholders for analysis further comprises, an executable portion allowing the process owners to notify the client managers or technicians when the process owners reviewing the captured call data discover that the calls made to a client manager are not being forwarded to the call center representative.

Another embodiment of the invention is a system comprising a computer-readable medium providing computer-readable instructions, a communication device, and a processor operatively coupled to the communication device and the computer-readable medium. The processor is configured to execute the computer-readable instructions to switch incoming calls coming from a client that are directed to a phone of a client manager to a phone of a call center representative. The processor is also configured to execute the computer-readable instructions to capture call data related to all of the incoming calls from clients and send the captured call data relating to the incoming calls to process owners or stakeholders for analysis.

In further accord with an embodiment of the invention, the captured call data related to incoming calls comprises at least one of the call volume, the date and time of the call, the average speed of answer, the ring time, average talk time, the call origination, the call destination, the average, upper limit, and the lower limit of the number of calls made to the all the client managers.

In another embodiment of the invention, the processor is configured to execute the computer-readable instructions to develop charts or reports based on the captured call data related to the incoming calls.

In yet another embodiment of the invention, the processor is configured to execute the computer-readable instructions to allow the process owners to notify the client managers or technicians when the process owners reviewing the captured call data discover that the calls made to a client manager are not being forwarded to the call center representative.

The features, functions, and advantages that have been discussed may be achieved independently in various embodiments of the present invention, or may be combined in yet other embodiments, further details of which can be seen with reference to the following description and drawings.

BRIEF DESCRIPTION OF THE SEVERAL VIEWS OF THE DRAWINGS

Figure 1:
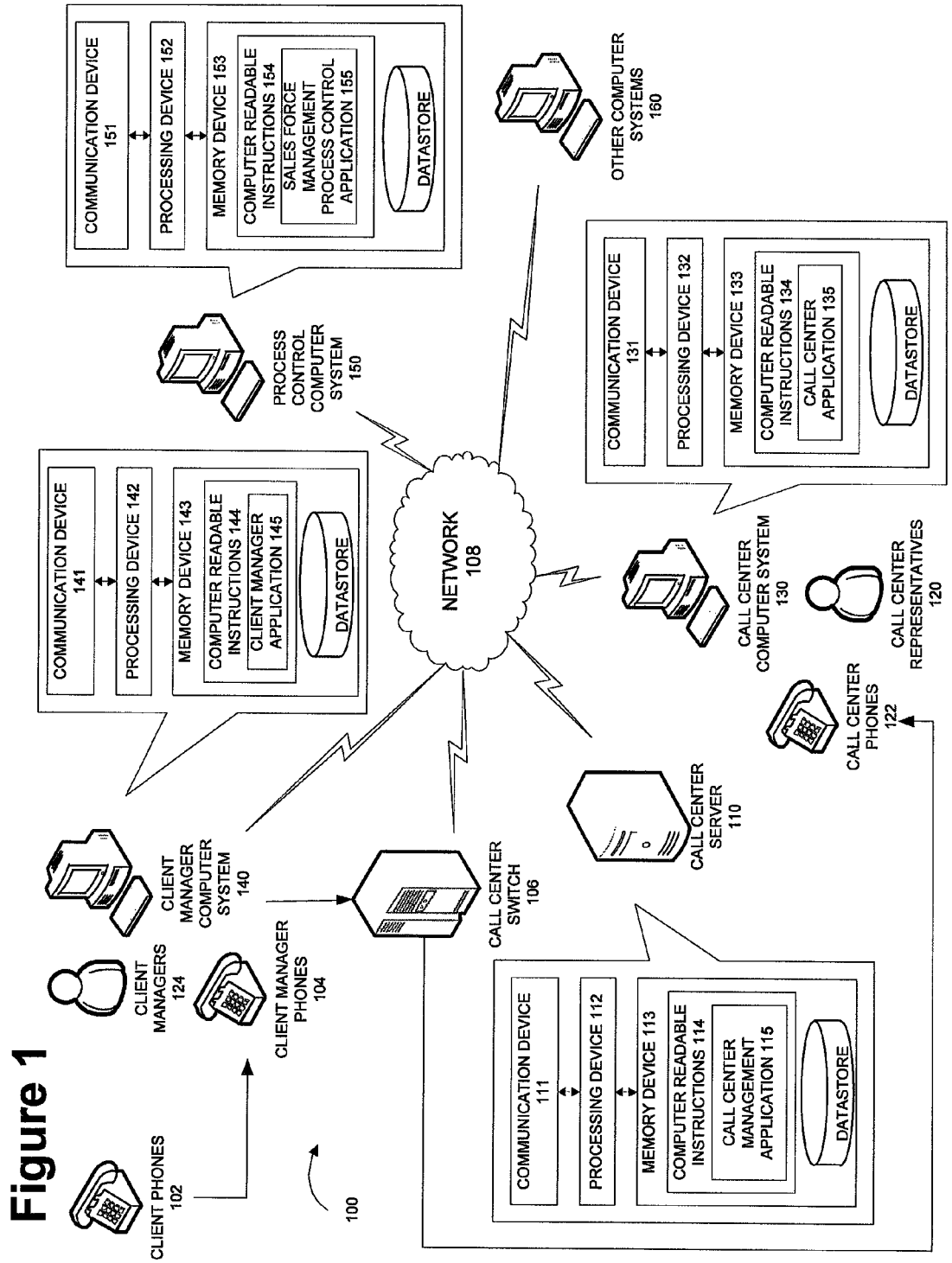
Figure 2:
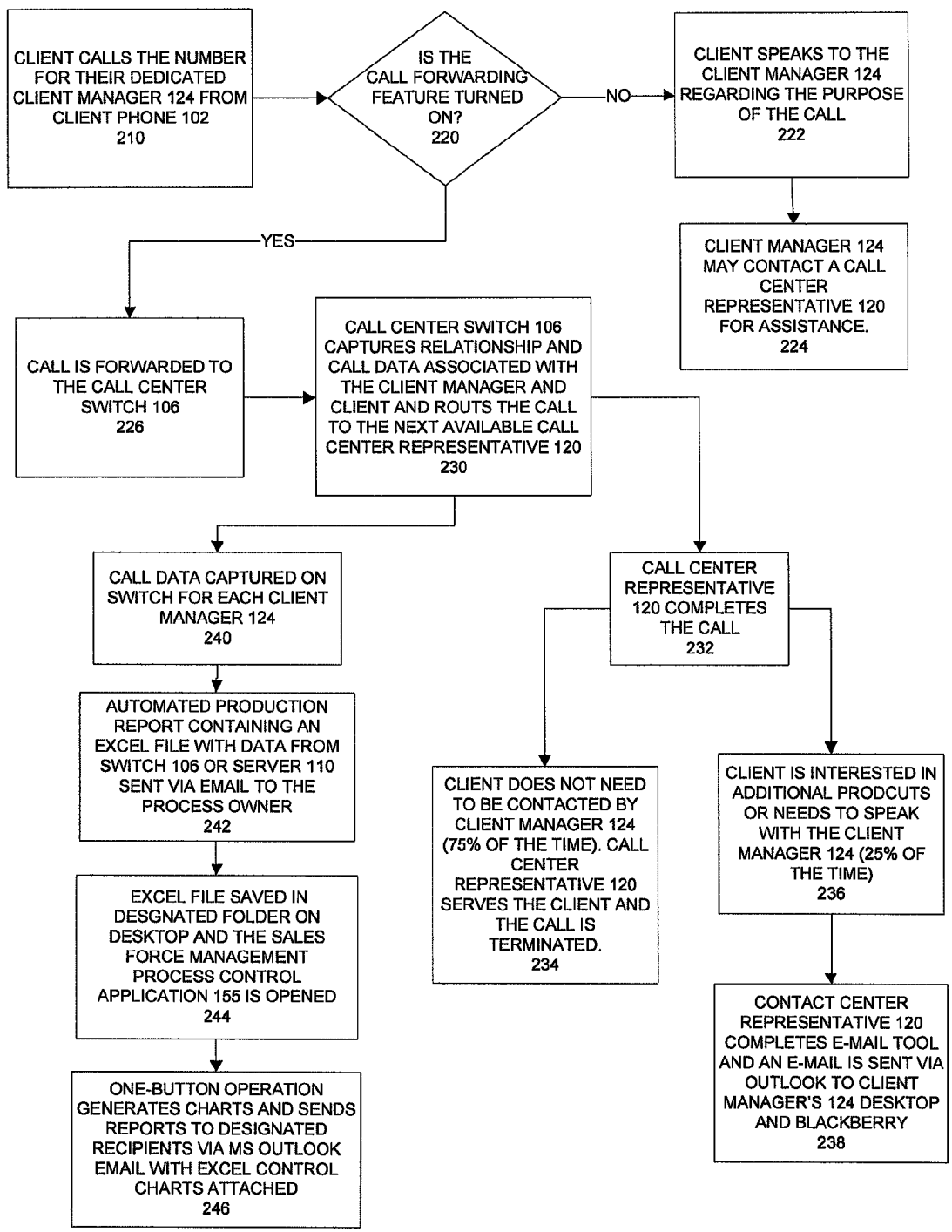
Figure 4:
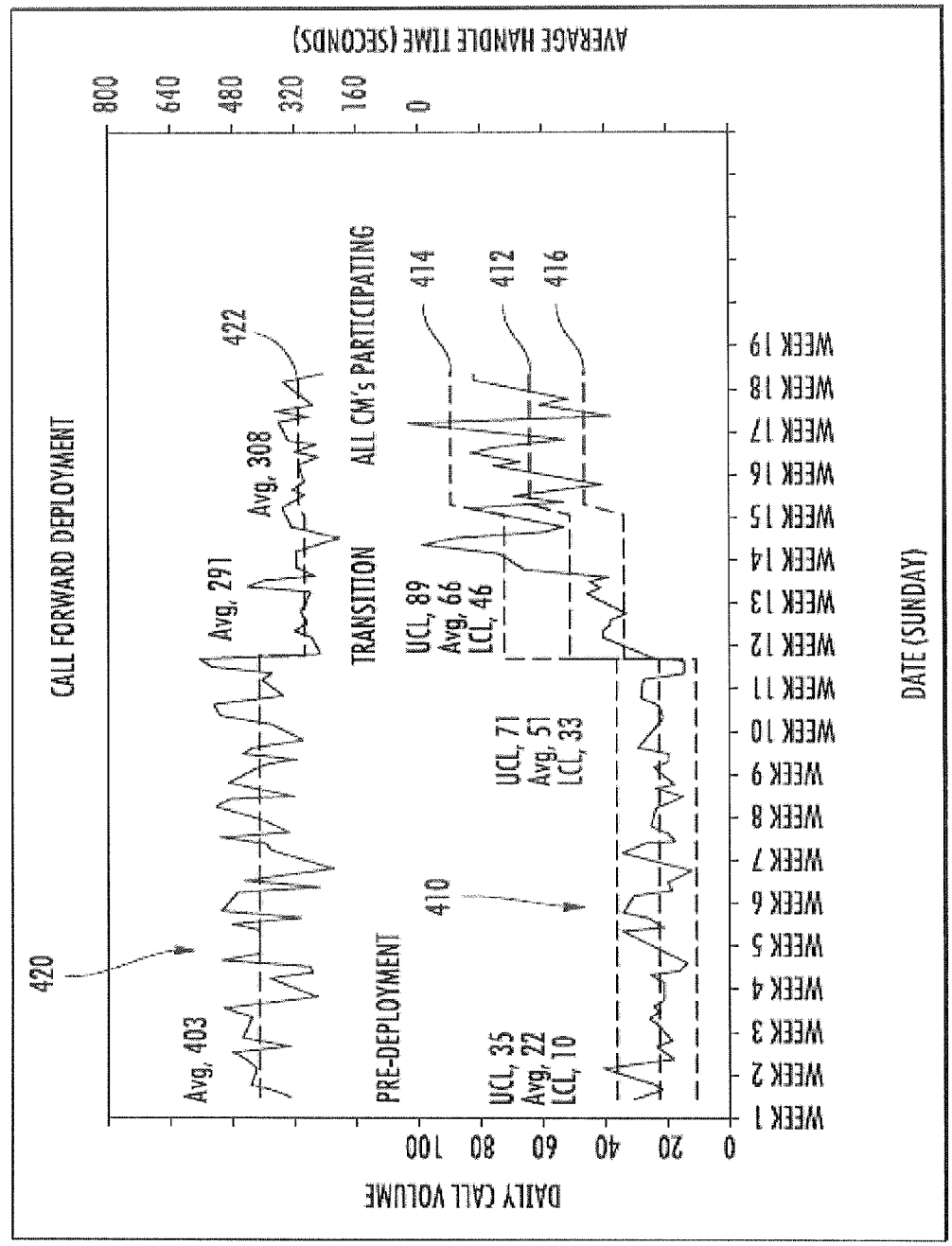
Figure 5:
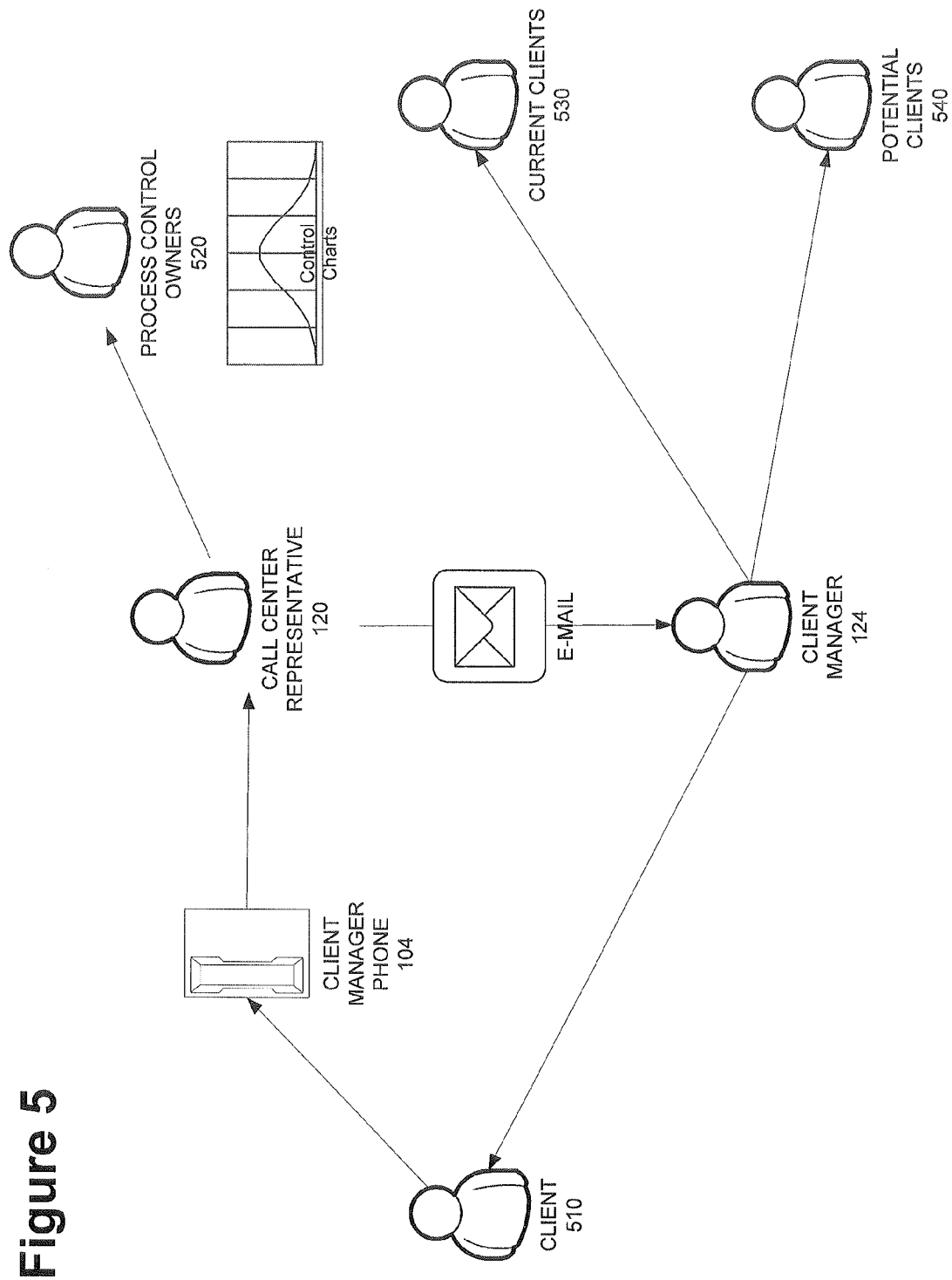

Having thus described embodiments of the invention in general terms, reference will now be made to the accompanying drawings, which are not necessarily drawn to scale, and wherein:

FIG. 1 provides a sales force management system, in accordance with an embodiment of the invention;

FIG. 2 illustrates a process map outlining the steps involved in using the sales force management system, in accordance with an embodiment of the invention;

FIG. 3 illustrates a standardized e-mail message used by the call center, in accordance with an embodiment of the invention;

FIG. 4 illustrates a process control chart for analyzing the sales force management system, in accordance with an embodiment of the invention; and FIG. 5 illustrates a flow diagram indicating how users implement the process in the sales force management system, in accordance with an embodiment of the invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although the embodiments of the invention described herein are generally described as involving a "bank," one of ordinary skill in the art will appreciate that other embodiments of the invention may involve other financial institutions or businesses that utilize sales teams and call centers or other comparable systems.

As will be appreciated by one of skill in the art, the present invention may be embodied as a method, system, computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), other tangible optical or magnetic storage device; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in computer memory.

Embodiments of the present invention are described below with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture, including instruction means, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments of the present invention further provide a plurality of User Interfaces ("UI") and dashboards to be displayed using a display device communicatively coupled to a computing device. These UIs and dashboards are generated and operated by a processor executing computer-readable program instructions embodied in a computer-readable medium. The UIs and dashboards display the reports and process control metrics that are used to monitor the sales force management environment.

FIG. 1 illustrates a sales force management environment 100 in which an embodiment of the present invention exists. As illustrated in FIG. 1, Client Phones 102 are operatively coupled to the Client Manager Phones 104 through standard telephone wires, wireless networks, or some other medium, which is used to connect one or multiple phones to each other. Client Manager Phones 104 are also operatively coupled to at least one Call Center Switch 106, which could be an electronic switch, including but not limited to a digital telecom switch. Switches are typically multiple layers of simpler subswitches, each layer is interconnected by a web of wires that connects each switch layer to the other switch layers and thus connects the subswitches. Various types of switches exist and would work in the sales force management environment 100. The Call Center Switch 106 may be connected to and controlled by one or more Call Center Servers 110 through a network 108. The network 108 may be a global area network (GAN), such as the Internet, a wide area network (WAN), a local area network (LAN), or any other type of network or combination of networks. The network 108 may provide for wireline, wireless, or a combination of wireline and wireless communication between devices in the network.

As illustrated in FIG. 1, the Call Center Servers 110 generally comprise a communication device 111, a processing device 112, and a memory device 113. The processing device 112 is operatively coupled to the communication device 111 and the memory device 113. The processing device 112 uses the communication device 111 to communicate with the network 108. As such, the communication device 111 generally comprises a modem, server, or other device for communicating with other devices on the network 108. As further illustrated in FIG. 1, the Call Center Servers 110 include computer-readable instructions 114 stored in the memory device 113, which include the computer-readable instructions 114 for a Call Center Management Application 115 for managing functions of the Call Center.

The Call Center Switch 106 is also operatively coupled to the Call Center Phones 122 of the Call Center Representatives 120. The Call Center Representatives 120 have access to the Call Center Computer systems 130. The Call Center Computer Systems 130 generally comprise a communication device 131, a processing device 132, and a memory device 133. The processing device 132 is operatively coupled to the communication device 131 and the memory device 133. The processing device 132 uses the communication device 131 to communicate with the network 108. As such, the communication device 131 generally comprises a modem, server, or other device(s) for communicating with other devices on the network 108, and a display, mouse, keyboard, microphone, and/or speakers for communicating with one or more users. As further illustrated in FIG. 1, the Call Center Systems 130 contain computer-readable program instructions 134 stored in the memory device 133, which includes the computer-readable program instructions 134 for a Call Center Application 135 for running the Call Center programs.

The Call Center Computer Systems 130 are operatively coupled to the Client Manager Computer Systems 140 through the network 108. The Client Manager Computer Systems 140 generally comprise a communication device 141, a processing device 142, and a memory device 143. The processing device 142 is operatively coupled to the communication device 141 and the memory device 143. The processing device 142 uses the communication device 141 to communicate with the network 108. As such, the communication device 141 generally comprises a modem, server, or other device(s) for communicating with other devices on the network 108, and a display, mouse, keyboard, microphone, and/or speakers for communicating with one or more users. As further illustrated in FIG. 1, the Client Manger Computer Systems 140 contain computer-readable program instructions 144 stored in the memory device 143, which includes the computer-readable program instructions 144 for a Client Manager Application 145 to help run certain functions of the sales force management environment 100.

The Call Center Server 110 and other systems are also operatively coupled to a Process Control Computer System 150. The Process Control Computer System 150 generally comprises a communication device 151, a processing device 152, and a memory device 153. The processing device 152 is operatively coupled to the communication device 151 and the memory device 153. The processing device 152 uses the communication device 151 to communicate with the network 108. As such, the communication device 151 generally comprises a modem, server, or other device(s) for communicating with other devices on the network 108, and a display, mouse, keyboard, microphone, and/or speakers for communicating with one or more users. As further illustrated in FIG. 1, the Process Control Computer System 150 contains computer-readable program instructions 154 stored in the memory device 153, which includes the computer-readable program instructions 154 for a Sales Force Management Process Control Application 155 for analyzing the sales force management environment 100.

The Process Control Computer System 150 and other systems are operatively coupled to Other Computer Systems 160 through the network for sending out through the communication device 151, process control reports to users of the Other Computer Systems 160, Client Managers 124 who use the Client Manager Systems 140, and to Representatives using the Call Center Systems 130.

FIG. 2, illustrates a method describing how the sales force management environment 100 works in accordance with an embodiment of the invention. Clients 510 will typically call their dedicated Client Manager 124 whenever they have questions regarding products and services they purchased, as illustrated in block 210. In this case the Client 510 could be a bank client who is calling his Client Manager 124 for additional services that the Client 510 would like to purchase.

Decision diamond 220 illustrates that if the Client Manager 124 has not turned on the call forwarding feature then the Client Manager may answer the phone and speak to the Client 510 regarding the purpose of the call, as illustrated by block 222. The Client Manager 124 can handle whatever it is that the Client 510 needs whether it is selling the Client 510 another service or forwarding a technical issue on to a Call Center Representative 120 or other service technician, as illustrated by block 224. On the other hand, if the Client Manger 124 has turned on the call forwarding feature, the call is forwarded to the Call Center Switch 106, as illustrated in block 226. In one embodiment of the invention the call forwarding feature will automatically forward all of the calls going to the Client Manager's Phone 104. In other embodiments of the invention the Client Manager 124 may choose to have all of his calls forwarded, calls from specific numbers forwarded, calls during a certain time of day forwarded, or none of his calls forwarded whenever a incoming call is received or in one embodiment when the Client Manager 124 does not pick up the phone after a pre-determined number of rings.

As illustrated by block 230, when the call is switched from the Client Manager Phone 104 the Call Center Switch 106 captures relationship data associated with each call. The relationship data can include, but is not limited to, the Client Manger 124 that is being called, the schedule of the Client Manger 124 that is being called, the Client 510 that is making the call, the Client 510 account number, or the services the Client Manager 124 has sold to the Client 510. The Client Manger 124 that is being called may be identified through the Client Manager Phone 104 that the call is coming from by using the Client Manager's 124 dialed number identification service ("DNIS") number or other telephony switch code. The call is then routed to the next available Call Center Representative 120, who will complete the Client 510 call, as illustrated by block 232. In most cases, the Client's 510 issue is often service related, which the Call Center Representative 120 will be able to resolve over the telephone, as illustrated by block 234. However, in some cases the Client 510 is interested in additional products or needs to speak with the Client Manager 124 about the Client's 510 current products, as illustrated by block 236. In this case the Call Center Representative will use the sales management system's e-mail tool and send an e-mail to the Client Manager's 124 Client Manager Computer System 140, as illustrated by block 238. In one embodiment, the Client Manager Computer System 140 may be made up of a desktop computer as well as a Blackberry, or some other hand held personal device. The e-mail may be sent to the Client Manger's 124 hand held device, desktop, or both.

The e-mail tool may be programmed to work in Microsoft Outlook, or some other e-mail provider's application. One embodiment of the e-mail report 300 sent to the Client Manager 124 is illustrated in FIG. 3. The Severity Code 310 for the issue can be filled in by the Call Center Representative 120, based on the representative's judgment or some other scoring criteria. The Client Manger Information 320 is tied into the corporate directory for accuracy, or it could be filled in automatically by the Call Center Switch 106 and Call Center Server 110 when the call is transferred from the Client Manager's Phone 104 to the Call Center Phone 122. The Call Center Representative 120 will also fill in the Subject of the Email 330 and the Client Information 340. In some cases the Client Information 340 could be filled out automatically based on the number that the call is coming from. The Call Center Representative can also enter in a Call Back Time 350 that is most convenient for the Client Manager 124 to call back the Client 510. Finally, the Call Center Representative 120, if necessary, can enter text into the Message 360 section to describe in more detail the subject of the client call. After receiving the e-mail the Client Manager 124 will have all of the important details of the client call, so he/she will be more prepared to serve the Client 510 when calling the Client 510 back at or around the Client's 510 requested Call Back Time 350.

At the same time that client calls are being routed from Client Manger Phones 104 to Call Center Phones 122 and taken care of by Call Center Representatives 120, call data for all of the calls is being captured on the Call Center Switch 106 and sent to the Call Center Server 110, as illustrated by block 240. The call data being captured includes, but is not limited to the call volume, the date and time the call is made, the average speed of answer, the ring time, average talk time, the call origination and destination, the average, the upper limit, and the lower limit of the number of calls made to all the Client Managers 124. As illustrated by block 242, the call data is manipulated automatically into a production report, such as an excel file, and sent to the Process Control Computer System 150. The report is saved in a designated folder and the Sales Force Management Process Control Application is used to analyze the call data, as illustrated by block 244. A one-click button will generate numerous charts, such as six sigma reporting charts, and send them to process owners and/or stakeholders, as illustrated by block 246. In one embodiment the e-mails will be sent automatically through existing e-mail systems, to a modifiable distribution list of the appropriate process owners and/or stakeholders. The call data may be presented and analyzed in any number of various ways to monitor the sales force management environment 100.

An example of one of the charts is illustrated in FIG. 4, which displays the client call volume for a specific market, in this case Boston. The call data may be broken down into any number of categories, including but not limited to, individual Client Managers 124, the Client Managers 124 located in a specific market, or all of the Client Managers together. The example of the process chart 400 in FIG. 4, tracks both the Daily Call Volume 410 and the Average Handle Time 420 over the pre-deployment, the transition, and full integration of the system. The chart also tracks the average call volume 412, the upper control limit 414, and the lower control limit 416. These charts will allow a Process Control Owner 520 to examine instantly if there is a problem somewhere in the sales force management environment 100. For example, a Process Control Owner 520 could see a chart for an individual Client Manager 124, which indicates that no service calls for that manager have been distributed to the Call Center Representatives 120 for a particular day. This could instantly alert the Process Control Owner 520 that the Client Manager 124 failed to turn on the call forwarding system or that the Client Manager's Phone 104 is malfunctioning. Another process control chart may show that no calls have come in from the New York market for the last hour, which would alert the Process Control Owner 520 that there could be an issue with the Call Center Switch 106 not working properly, in which case the Process Control Owner 520 would initiate a service request to investigate the issue.

FIG. 5, illustrates how the sales force management environment 100 benefits the users of the system. The Client 510 tries to contact the Client Manager 124 at the Client Manager's Phone 104. Typically, the Client Manager 124 does not receive the call since he/she is often on calls, in meetings, or out selling new services to Current Clients 530 or Potential Clients 540. Before the sales force management environment 100 was developed the Client Manager 124 had to listen to a voicemail, possibly call the Client 510 back to determine the issue, talk to the Call Center Representatives 120 to determine the best course of action, and call back the Client 510 again with the solution. All the while the Client Manager 124 is doing the same thing with other Current Clients 530 and Potential Clients 540, and often not responding to the Client 510 who called until days or weeks after the Client 510 called. This makes for a very inefficient system and one where there is a potential for Client 510 dissatisfaction, lost sales, and reduced creditability.

FIG. 5, illustrates the new system where a Client's 510 call is routed to a Call Center Representative 120 who can provide the Client 510 instant service and solve many of the problems of the Client 510 without ever having to involve the Client Manager 124. If the Client 510 is interested in getting a new service, has a problem with the current service, or simply wants to deal with his Client Manager 124 an email indicating the Client's 510 issue along with other information is sent to the Client Manager 124. Therefore, the Client Manager 124 has more time to deal with the issues of selling to Current Clients 530 and Potential Clients 540, be it over the phone or in person, and he/she has been apprised by the Call Center Representative 120 in advance that a particular Client 510 has a specific issue that the Client 510 would like to discuss with him/her. The Client Manager 124 no longer has to worry about service related issues that can be more readily handled by a Call Center Representative 120. Furthermore, the whole sales force management environment 100 is monitored by Process Center Owners 520 who have the ability to examine the system metrics in real, or near-real time, to constantly improve on the performance of the environment, Client Manager 124, or Call Center Representatives 120.

Although FIGS. 1 and 5 illustrate the systems, servers, and switches as one system and the Client 510, Client Manager 124, Call Center Representative 120, Process Owner 520, Current Client 530, and Potential Client 540 as one person, it is important to note that there can be one or multiple systems, each with similar components and multiple people that handle calls and reports from multiple Clients 510 at a time. Furthermore, although FIG. 1 illustrates the systems as separate, in other embodiments the systems may be a part of a single sales force management environment 100 or other computer system 160.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A system comprising:
   a computer-readable medium providing computer-readable instructions;
   a communication device; and
   a processor operatively coupled to the communication device and the computer-readable medium, wherein the processor is configured to execute the computer-readable instructions to:

receive an incoming call coming from a client that is directed to a phone number of a client manager, wherein the client manger is a specific client manager for the client and the phone number is a direct number for the client manager;

determine if the client manager has activated a call forwarding feature, wherein the client manager activates the called forwarding feature to request that incoming calls be forwarded to a call center;

direct the incoming call to the phone number of the client manager when the call forwarding feature is off;

capture relationship data related to the client manager that the client is calling when the call forwarding feature is activated, wherein the relationship data is an identity of the client manager that is being called;

direct the incoming call to the call center when the call forwarding feature is activated;

forward the relationship data to the call center when the call forwarding feature is activated, wherein a call center switch routes the incoming call and the relationship data to a call center representative;

provide call data related to the incoming call to a process owner for analysis; and provide a notification to the client manger when the process owner determines that incoming calls to the client manager fail to be forwarded to the call center.

2. The system of claim 1, wherein the relationship data includes the client manger that is being called, the schedule of the client manager that is being called, the client that is making the call, the client account number, or the services the client manager has sold to the client.

3. The system of claim 1, wherein the processor is configured to execute the computer-readable instructions to:
create a notification related to the client call if the client manager needs to be notified regarding the client call; and
send the notification to the client manager.

4. The system of claim 1, wherein the processor is configured to execute the computer-readable instructions to:
capture call data related to all of the incoming calls from clients.

5. The system of claim 4, wherein the captured call data related to incoming calls comprises:
at least one of the call volume, the date and time of the call, the average speed of answer, the ring time, average talk time, the call origination, the call destination, the average, upper limit, and the lower limit of the number of calls made to all the client managers.

6. The system of claim 4, wherein the processor is configured to execute the computer-readable instructions to:
develop charts or reports based on the captured call data related to the incoming calls.

7. A method comprising:
receiving an incoming call coming from a client that is directed to a phone number of a client manager, wherein the client manger is a specific client manager for the client and the phone number is a direct number for the client manager determining, by a processing device, if the client manager has activated a call forwarding feature, wherein the client manager activates the called forwarding feature to request that incoming calls be forwarded to a call center;

directing, by the processing device, the incoming call to the phone number of the client manager when the call forwarding feature is off;

capturing, by the processing device, relationship data related to the client manager that the client is calling when the call forwarding feature is activated, wherein the relationship data is an identity of the client manager that is being called;

directing, by the processing device, the incoming call to the call center when the call forwarding feature is activated;

forwarding, by the processing device, the relationship data to the call center when the call forwarding feature is activated representative, wherein a call center switch routes the incoming call and the relationship data to a call center representative;

providing, by the processing device, call data related to the incoming call to a process owner for analysis; and providing, by the processing device, a notification to the client manger when the process owner determines that incoming calls to the client manager fail to be forwarded to the call center.

8. The method of claim 7, wherein capturing relationship data comprises capturing the client manager that is being called, the schedule of the client manager that is being called, the client that is making the call, the client account number, or the services the client manager has sold to the client.

9. The method of claim 7, further comprising:
creating, through the use of a processor, a notification related to the client call if the client manager needs to be notified regarding the client call; and
sending, through the use of a processor, the notification to the client manager.

10. The method of claim 7, further comprising:
capturing, through the use of a processor, call data related to all of the incoming calls from clients.

11. The method of claim 10, wherein capturing call data related to incoming calls comprises capturing at least one of the call volume, the date and time of the call, the average speed of answer, the ring time, average talk time, the call origination, the call destination, and the average number, upper limit, and the lower limit of the number of calls made to all the client managers.

12. The method of claim 10, wherein capturing call data related to incoming calls further comprises:
developing, through the use of a processor, charts or reports based on the captured call data related to the incoming calls.

13. A computer program product for a sales force management system, the computer program product comprising at least one non-transitory computer-readable medium having computer-readable program code portions embodied therein, the computer-readable program code portion comprising:

an executable portion configured for receiving an incoming call coming from a client that is directed to a phone number of a client manager, wherein the client manger is a specific client manager for the client and the phone number is a direct number for the client manager;

an executable portion configured for determining if the client manager has activated a call forwarding feature wherein the client manager activates the called forwarding feature to request that incoming calls be forwarded to a call center;

an executable portion configured for directing the incoming call to the phone number of the client manager when the call forwarding feature is off;

an executable portion configured for capturing relationship data related to the client manager that the client is calling when the call forwarding feature is activated, wherein the relationship data is an identity of the client manager that is being called;

an executable portion configured for directing the incoming call to the call center when the call forwarding feature is activated;

an executable portion configured for forwarding the relationship data related to the call center when the call forwarding feature is activated, wherein a call center switch routes the incoming call and the relationship data to a call center representative;

an executable portion configured for providing call data related to the incoming call to a process owner for analysis; and an executable portion configured for providing a notification to the client manger when the process owner determines that incoming calls to the client manager fail to be forwarded to the call center.

14. The computer program product of claim 13, wherein the relationship data includes the client manager that is being called, the schedule of the client manager that is being called, the client that is making the call, the client account number, or the services the client manager has sold to the client.

15. The computer program product of claim 13, the computer program product further comprising:

an executable portion configured for creating a notification related to the client call if the client manager needs to be notified regarding the client call; and an executable portion configured for sending the notification to the client manager.

16. The computer program product of claim 13, the computer program product further comprising:

an executable portion configured for capturing call data related to incoming calls.

17. The computer program product of claim 16, wherein the executable portion configured for capturing data related to incoming calls comprises capturing at least one of the call volume, the date and time of the call, the average speed of answer, the ring time, average talk time, the call origination, the call destination, and the average number, upper limit, and the lower limit of the number of calls made to all the client managers.

18. The computer program product of claim 16, wherein the executable portion configured for capturing call data related to incoming calls further comprises:

an executable portion configured for developing charts or reports based on the captured data related to the incoming calls.

19. A system comprising:

a computer-readable medium providing computer-readable instructions;

a communication device; and a processor operatively coupled to the communication device and the computer-readable medium, wherein the processor is configured to execute the computer-readable instructions to:

receive incoming calls coming from clients that are directed to phone numbers of client managers, wherein the client mangers are specific client managers for the clients and the phone numbers are direct numbers for the client managers;

determine if the client managers have activated a call forwarding feature wherein the client managers activate the called forwarding feature to request that incoming calls be forwarded to a call center;

capture relationship data related to the client managers that the clients are calling when the call forwarding feature is activated, wherein the relationship data is identities of the of the client managers that are being called;

direct the incoming calls to the call center when the call forwarding feature is activated;

forward the relationship data to the call center when the call forwarding feature is activated, wherein a call center switch routes the incoming calls and the relationship data to call center representatives;

capture call data related to all of the incoming calls from the clients;

provide the call data related to the incoming calls to a process owner for analysis; and provide a notification to the client manger when the process owner determines that the incoming calls to the client manager fail to be forwarded to the call center.

20. The system of claim 19, wherein the captured call data related to incoming calls comprises:

at least one of the call volume, the date and time of the call, the average speed of answer, the ring time, average talk time, the call origination, the call destination, the average, upper limit, and the lower limit of the number of calls made to the all the client managers.

21. The system of claim 19, wherein the processor is configured to execute the computer-readable instructions to:

develop charts or reports based on the captured call data related to the incoming calls.

* * * * *